United States Patent
Tan et al.

(10) Patent No.: US 12,458,708 B2
(45) Date of Patent: Nov. 4, 2025

(54) MARINE POLYSACCHARIDE VECTOR-BASED ANTHOCYANIN NANOPARTICLES, AND PREPARATION METHOD THEREFOR AND APPLICATION THEREOF IN TARGETED DELIVERY

(71) Applicant: Dalian Polytechnic University, Dalian (CN)

(72) Inventors: Mingqian Tan, Dalian (CN); Xue Zhao, Dalian (CN); Xuedi Zhang, Dalian (CN); Shanshan Tie, Dalian (CN); Jiyun Cao, Dalian (CN); Yun Li, Dalian (CN)

(73) Assignee: Dalian Polytechnic University, Dalian (CN)

( * ) Notice: Subject to any disclaimer, the term of this patent is extended or adjusted under 35 U.S.C. 154(b) by 358 days.

(21) Appl. No.: 18/204,436

(22) Filed: Jun. 1, 2023

(65) Prior Publication Data

US 2023/0355802 A1    Nov. 9, 2023

Related U.S. Application Data

(63) Continuation of application No. PCT/CN2020/142199, filed on Dec. 31, 2020.

(30) Foreign Application Priority Data

Dec. 2, 2020   (CN) .................... 202011385600.6

(51) Int. Cl.
| | |
|---|---|
| *A61K 47/69* | (2017.01) |
| *A61K 9/19* | (2006.01) |
| *A61K 31/352* | (2006.01) |
| *A61K 49/00* | (2006.01) |
| *A61P 1/00* | (2006.01) |
| *A61P 39/06* | (2006.01) |

(52) U.S. Cl.
CPC ............ *A61K 47/6939* (2017.08); *A61K 9/19* (2013.01); *A61K 31/352* (2013.01); *A61K 49/0054* (2013.01); *A61K 49/0093* (2013.01); *A61P 1/00* (2018.01); *A61P 39/06* (2018.01)

(58) Field of Classification Search
CPC .... A61K 47/6939; A61K 9/19; A61K 31/352; A61K 49/0054; A61K 49/0093; A61K 9/5161; A61K 31/728; A61K 47/36; A61K 47/46; A61P 1/00; A61P 39/06; Y02A 50/30; B82Y 20/00; B82Y 30/00; B82Y 40/00
See application file for complete search history.

(56) References Cited

FOREIGN PATENT DOCUMENTS

| | | |
|---|---|---|
| CN | 108273071 A | 7/2018 |
| CN | 108929683 A | 12/2018 |
| CN | 110326785 A | 10/2019 |
| KR | 20120126587 A | 11/2012 |

OTHER PUBLICATIONS

Tan, Bing et. al. "Inhibition of Lipopolysaccharide-induced RAW264.7 Cells Inflammatory Reaction by Total Anthocyanins from Red Cabbage" Modern Food science and technology. 2018. vol. 34, No. 11, p. 8-14.
Xia, Yuan "Studies on the effect of low dose of cyanidin-3-O-glucoside on dextran sulfate sodium-induced colitis and its mechanisms" Medicine and Health Sciences, China Master's These Full-Text Database, No. 9, Sep. 15, 2019. pp. E079-E185.

*Primary Examiner* — Jeffrey T. Palenik
(74) *Attorney, Agent, or Firm* — IPRO, PLLC; Na Xu

(57) ABSTRACT

The disclosure provides marine polysaccharide vector-based anthocyanin nanoparticles, using marine polysaccharides, food-borne fluorescent nanoparticles and sodium hyaluronate as a composite vector to be combined with anthocyanin, and is prepared by a method: S1, dissolving sodium alginate in phosphate buffered saline, and successively adding EDC, HOBt and the food-borne fluorescent nanoparticles to obtain a fluorescence-alginate complex; S2, adding the fluorescence-alginate complex into a mixture of DMF and DCM, and then adding DIC and DMAP; S3, adding the anthocyanin and hyaluronic acid, and then removing a solvent; and S4, removing unreacted small molecules, and carrying out freeze drying.

8 Claims, 8 Drawing Sheets

MARINE POLYSACCHARIDE VECTOR-BASED ANTHOCYANIN NANOPARTICLES, AND PREPARATION METHOD THEREFOR AND APPLICATION THEREOF IN TARGETED DELIVERY

TECHNICAL FIELD

The disclosure relates to the field of nanotechnology, and more specifically, to marine polysaccharide vector-based anthocyanin nanoparticles, and preparation therefor and application thereof in fluorescent tracing and colon-targeted delivery.

BACKGROUND

Anthocyanins are biologically active compounds belonging to flavonoids. They exist in human nutrition through plant foods. Anthocyanins are abundant in the fruit composition of bilberries, and have strong antioxidant properties, so that regular consumption of the bilberries has health benefits. However, environmental conditions such as pH and temperature have a great influence on the color stability and properties of the anthocyanins. The anthocyanins prepared by the prior art are poor in stability; especially, sodium alginate microspheres prepared by an emulsification method cannot stay in the upper digestive tract for enough time, which results in low bioavailability and needs to be improved.

Nanotechnology, as the main application of nano-encapsulation of biologically active compounds, has developed rapidly in various fields such as the food industry. Nano-encapsulation technology is defined as a process in which biologically active compositions are encapsulated by a coated carrier material and delivered to a core at the correct time and location. In the process of nano-encapsulation, in addition to its biological activity, nano-encapsulation can increase its surface-to-volume ratio by reducing the particle sizes to the nanometer range (usually less than 1 μm). Compared with the microspheres prepared by the general embedding methods, the bioavailability is further improved, and the slow release can be better controlled, thus having a good application prospect.

Therefore, it is particularly important that nanotechnology is used to invent a kind of anthocyanin nanoparticles with the characteristics of fluorescent tracing so as to further improve the anthocyanin stability and solve the problems of more accurate control of the slow release and fixed-point release of the anthocyanin.

SUMMARY

The disclosure provides marine polysaccharide vector-based anthocyanin nanoparticles, and preparation therefor and application thereof in fluorescent tracing and colon-targeted delivery, so as to solve the problems that in the prior art, bilberry anthocyanins are poor in stability, and the functional active compositions are vulnerable to loss. Moreover, the disclosure provides application of anthocyanin nanoparticle pretreatment in protection of lipopolysaccharide (LPS)-mediated RAW 264.7 macrophage apoptosis and alleviation of dextran sulfate sodium (DSS)-induced colitis injury.

In order to achieve the above purpose, the disclosure provides marine polysaccharide vector-based anthocyanin nanoparticles, where the anthocyanin nanoparticles use polysaccharides, food-borne fluorescent nanoparticles and sodium hyaluronate as a composite vector to be combined with anthocyanin.

Preferably, the polysaccharides include sodium alginate.

The disclosure further provides a preparation method for the marine polysaccharide vector-based anthocyanin nanoparticles, which includes the following steps:

S1: dissolving sodium alginate in phosphate buffered saline with a pH value of 4.75-6, adding EDC (1-ethyl-(3-dimethylaminopropyl) carbodiimide) and HOBt (1-hydroxybenzotriazole) successively, stirring at room temperature for 60-80 min and then adding the food-borne fluorescent nanoparticles, continuing to stir for 24-30 h, and carrying out dialysis with deionized water for 24-72 h and freeze drying to obtain a fluorescence-alginate complex;

S2: adding the fluorescence-alginate complex into a mixture of DMF (N, N-dimethylformamide) and DCM (dichloromethane), adding DIC (diisopropyl carbodiimide) and DMAP (dimethylaminopyridine) which are mixed in a volume ratio of 1:(1-1.5) thereinto, and stirring at room temperature for 1-1.5 h;

S3: adding the anthocyanin and hyaluronic acid to react at room temperature for 24-30 h, washing with the DCM for 3-5 times, and evaporating to remove a solvent; and S4: washing with the DMF, dialyzing with the DMF for 20-30 h to remove unreacted small molecules and the DMF, pre-cooling at −80° C. for 2-3 h, and carrying out freeze drying at −50° C. to −55° C. for 24-72 h under the condition that the vacuum degree is 35-45 Pa.

Preferably, the evaporation conditions in step S3 are a temperature of 25-40° C. and a vacuum degree range of 0.29-1.6 mbar.

Preferably, a method for removing the unreacted small molecules in step S4 includes first washing with the DMF and then dialyzing with the DMF; and a method for removing the DMF includes dialyzing with deionized water.

Preferably, the stirring speed in steps S1 and S2 is 500-800 r/min.

Preferably, a preparation method for the food-borne fluorescent nanoparticles includes the following steps:

S1: cutting pork belly into pieces, roasting same at 150° C. to 320° C. for 15-40 min, soaking in absolute ethanol and stirring continuously for 12-36 h, and removing ethanol from the filtered soluble portion; and S2: preparing a solution by using trichloromethane and water in a ratio of 3:1, redissolving the soluble portion from which the ethanol has been removed in S1, adding the trichloromethane for extraction and repeated degreasing until an oil phase is clarified, selecting a clear water phase portion to undergo chromatography, pre-cooling the fluorescent portion at −80° C. for 2-3 h, and then carrying out freeze drying at −50° C. for 24-72 h under the condition that the vacuum degree is 40 Pa.

Preferably, chromatographic column packing for chromatography in step S2 is composed of D101 macroporous adsorption resin.

The disclosure has the following beneficial effects.

(1) The disclosure uses the marine polysaccharide (i.e., sodium alginate), food-borne fluorescent nanoparticles and sodium hyaluronate as raw materials for the composite vector of the anthocyanin; and in the disclosure constructed by the composite vector, the use of food-borne nanoparticles instead of chemical fluorescent additives is the first case in the vectors for delivering anthocyanins.

(2) Compared with the prior art, the vector designed in the disclosure has many advantages, which can further reduce the damage to the molecular structure of anthocyanin caused by environmental factors such as temperature and pH.

(3) Compared with vectors prepared by other methods, the sodium alginate nanoparticles prepared by the method of the disclosure improve the stability of anthocyanins in salt solutions, at different pH values, under ultraviolet light irradiation and during storage, where the retention rate of the anthocyanins is increased by 8-15%, with stronger stability; and compared with sodium alginate microspheres prepared by an emulsification method, the disclosure also has the characteristics of targeted delivery, and can accurately control the slow release and fixed-point release of the anthocyanins.

(4) The disclosure has a better protective effect on lipopolysaccharide (LPS)-mediated RAW 264.7 macrophage apoptosis, and the anthocyanin nanoparticles of the disclosure can be delivered to the colons of BALB/c mice in a targeted manner, which can further alleviate dextran sulfate sodium (DSS)-induced colitis injury. The disclosure also has the characteristics of fluorescent tracing, and is better in photostability and biocompatibility compared with chemical fluorescent additives. The disclosure can also be used as a fluorescent marker for in vivo imaging of animal tissues, organs, etc.

DETAILED DESCRIPTION

Figure 1:
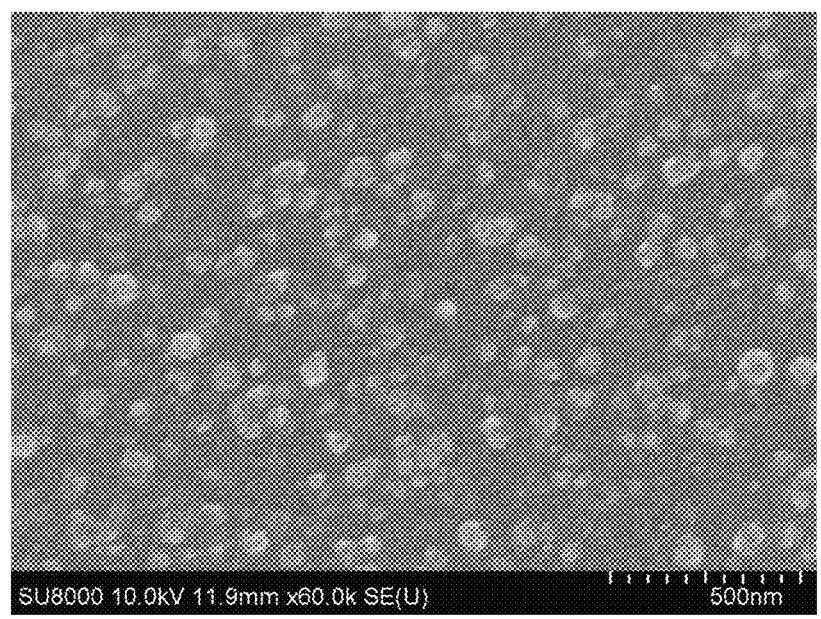
FIG. 1 is a scanning electron microscope (SEM) photograph of anthocyanin nanoparticles prepared in Example 1.

In order to enable those skilled in the art to better understand the disclosure, the disclosure will be further described below in conjunction with specific implementations.

1. Preparation of Anthocyanin Nanoparticles
S1: 5-30 mg of sodium alginate was dissolved in phosphate buffered saline with a pH of 4.75-6, 35-70 mg of EDC and 25-50 mg of HOBt were added successively, 1-5 mg of food-borne fluorescent nanoparticles were added after magnetic stirring was performed at room temperature for 60-80 min under the condition that the stirring speed was 500-800 r/min, magnetic stirring was performed at room temperature for 24-30 h under the condition that the stirring speed was 500-800 r/min, and dialysis was performed with deionized water for 24-72 h, and freeze drying was carried out to obtain a fluorescence-alginate complex;

S2: hyaluronic acid could be further conjugated to alginate skeleton through an esterification reaction, and water produced in the esterification reaction process was eliminated by using diisopropyl carbodiimide (DIC) as a coupling agent and dimethylaminopyridine (DMAP) as a catalyst; 40-60 mg of the fluorescence-alginate complex was added into 4-6 mL of a mixture of DMF and DCM which were mixed in a volume ratio of 1:(1-1.5), 8-16 mg of the DIC and 25-50 mg of the DMAP were added thereinto, and the obtained mixture was stirred at room temperature for 1-1.5 h under the condition that the stirring speed was 500-800 r/min;

S3: then, 1-5 mg of anthocyanin and 8-12 mg of the hyaluronic acid were added to react at room temperature for 24-30 h, the sample was washed with the DCM for 3-5 times, and the product was evaporated at 25° C. to 40° C. within a vacuum degree range of 0.29-1.6 mbar so as to remove a solvent; the anthocyanin could form an electrostatic interaction with fluorescence-alginate complex through electrostatic self-assembly, and the anthocyanin with phenolic hydroxyl groups could also undergo the esterification reaction with the carboxyl groups of alginic acid; and S4: the product was washed with the DMF and then dialyzed with the DMF for 20-30 h to remove unreacted small molecules, the DMF was removed by dialysis with deionized water for 24-72 h, pre-cooling was carried out at −80° C. for 2-3 h, and freeze drying was carried out at −50° C. to −55° C. for 24-72 h under the condition that the vacuum degree was 35-45 Pa.

2. Preparation of Food-Borne Fluorescent Nanoparticles
S1: Pork belly was cut into small pieces, roasted at 150° C. to 320° C. for 15-40 min, soaked in 1-4 L of absolute ethanol and stirred continuously for 12-36 h under the condition that the stirring speed was 500-800 r/min, and ethanol was removed from the filtered soluble portion; and S2: a solution was prepared by using trichloromethane and water in a ratio of 3:1, the soluble portion from which the ethanol had been removed in S1 was redissolved, the trichloromethane was added for extraction and repeated degreasing until an oil phase was clarified, a clear water phase portion was selected to undergo chromatography, the fluorescent portion was pre-cooled at −80° C. for 2-3 h, and then freeze drying was carried out at −50° C. for 24-72 h under the condition that the vacuum degree was 35-45 Pa.

Example 1: Preparation of Anthocyanin Nanoparticles

S1: Sodium alginate (30 mg) was dissolved in phosphate buffered saline (with a pH of 4.75), EDC (35 mg) and HOBt (25 mg) were added successively and stirred at room temperature for 1 h, and food-borne fluorescent nanoparticles (5 mg) were added and stirred for 24 h; after that, the product was subjected to dialysis with deionized water for 24 h, and freeze drying was carried out to obtain a fluorescence-alginate complex;

S2: 40 mg of the fluorescence-alginate complex prepared in step S1 was added into 4 mL of a mixture of dimethylformamide (DMF) and DCM which were mixed in a volume ratio of 1:1, DIC (8.1 mg) and DMAP (25 mg) were added thereinto, and the reaction mixture was gently stirred at room temperature for 1 h to activate the carboxyl groups of alginic acid;

S3: 1 mg of anthocyanin and 8 mg of hyaluronic acid were slowly added into the mixture prepared in step S2 to further react at room temperature for 24 h; and S4: a sample was washed with the DCM for 3 times and subjected to rotary evaporation within a vacuum degree range of 0.29-1.6 mbar at 25° C. to remove a solvent, the obtained product was washed with the DMF and dialyzed with the DMF for 24 h to remove unreacted small molecules, the DMF was removed by dialysis with deionized water for 72 h, and finally, the obtained sample was pre-cooled at −80° C. for 2 h and subjected to freeze drying at −50° C. for 48 h under the condition that the vacuum degree was 40 Pa.

Example 2: Preparation of Food-Borne Fluorescent Nanoparticles 1 kg of pork belly was evenly cut into small pieces of 1×1×1 cm$^3$ and roasted at a temperature of 280° C. for 30 min, the roasted meat was soaked in 3 L of absolute ethanol and stirred continuously for 12 h, and a rotary evaporator was used for removing ethanol from the soluble portion filtered by three-layer filter paper; and a solution was prepared by using trichloromethane and water in a volume ratio of 3:1, the treated soluble portion was redissolved, the trichloromethane was added for extraction and repeated degreasing until an oil phase was clarified, a clear water phase portion was selected to undergo D101 macroporous adsorption resin column chromatography, the fluorescent portion was pre-cooled at −80° C. for 2 h, and then freeze drying was carried out at −50° C. for 48 h under the condition that the vacuum degree was 40 Pa.

Example 3: Characterization of the Properties of Anthocyanin Nanoparticles

S1: Morphology and Sizes of the Anthocyanin Nanoparticles

FIG. 1 is a scanning electron microscope (SEM) photograph of the anthocyanin nanoparticles prepared in Example 1. It can be seen from FIG. 1 that the prepared nanoparticles resemble strawberry-like shapes, are uniformly distributed, and have particle sizes of about 30 nm.

Figure 2:
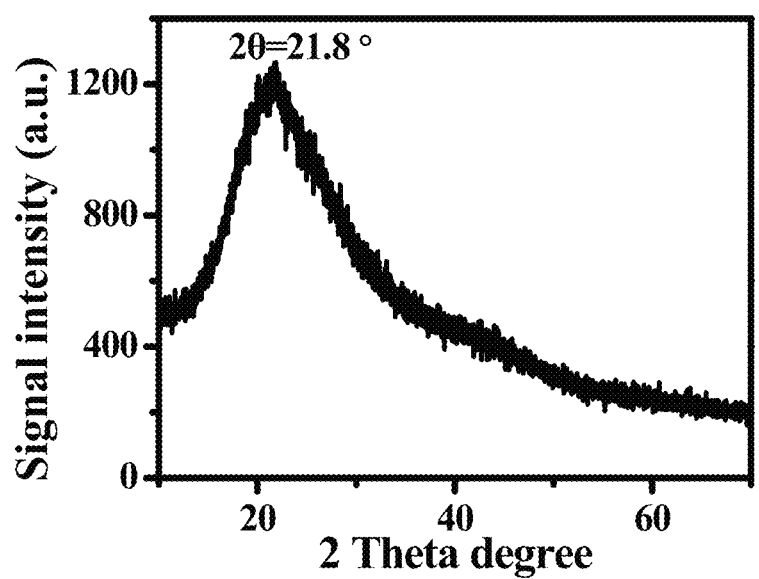
FIG. 2 is an XRD spectrum of the anthocyanin nanoparticles prepared in Example 1.

S2: X-Ray Photoelectron Diffraction (XRD) Experiments of the Anthocyanin Nanoparticles FIG. 2 is an XRD spectrum of the anthocyanin nanoparticles prepared in Example 1. It can be seen from FIG. 2 that there is a wide central diffraction peak at 2θ=21.8°, and no peaks are found at other positions, which shows the characteristic peak of the nanoparticles in an amorphous state.

Figure 3:
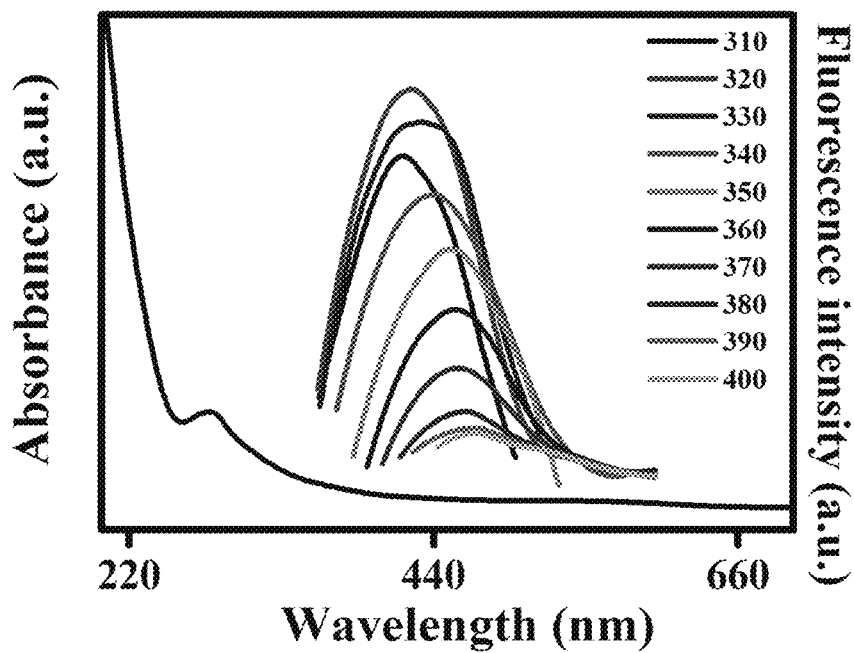
FIG. 3 is an ultraviolet and fluorescence spectrum of the anthocyanin nanoparticles prepared in Example 1.

S3: Ultraviolet Spectrum and Fluorescence Spectrum Characteristics of the Anthocyanin Nanoparticles FIG. 3 shows ultraviolet and fluorescence spectrum of the anthocyanin nanoparticles prepared in Example 1. It can be seen from FIG. 3 that the ultraviolet spectrum peak appears at 270 nm, which is speculated to be a characteristic absorption peak of n→π* transition; and from the fluorescence spectrum of the anthocyanin nanoparticles, it can be seen that there is an obvious red shift phenomenon with the increase of wavelength, and the maximum excitation wavelength of the nanoparticles appears at 320 nm.

S4: Fluorescence Lifetime of the Anthocyanin Nanoparticles

A lifetime test method is as follows: a 1 mg/mL anthocyanin nanoparticle aqueous solution was prepared, excited under an excitation light at 320 nm, and emitted when the maximum emission peak was at 420 nm, so that the fluorescence lifetime was measured.

Figure 4:
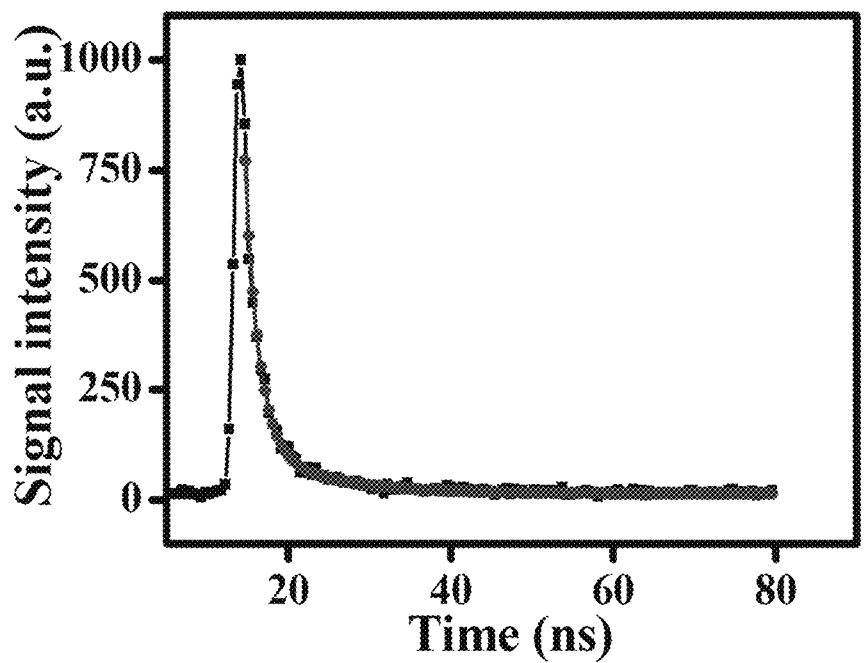
FIG. 4 is a fluorescence lifetime spectrum of the anthocyanin nanoparticles prepared in Example 1.

FIG. 4 is a fluorescence lifetime spectrum of the anthocyanin nanoparticles prepared in Example 1. It can be seen from FIG. 4 that the fluorescence lifetime of roasted meat nanoparticles calculated by fitting is 4.54 ns.

Figure 5:
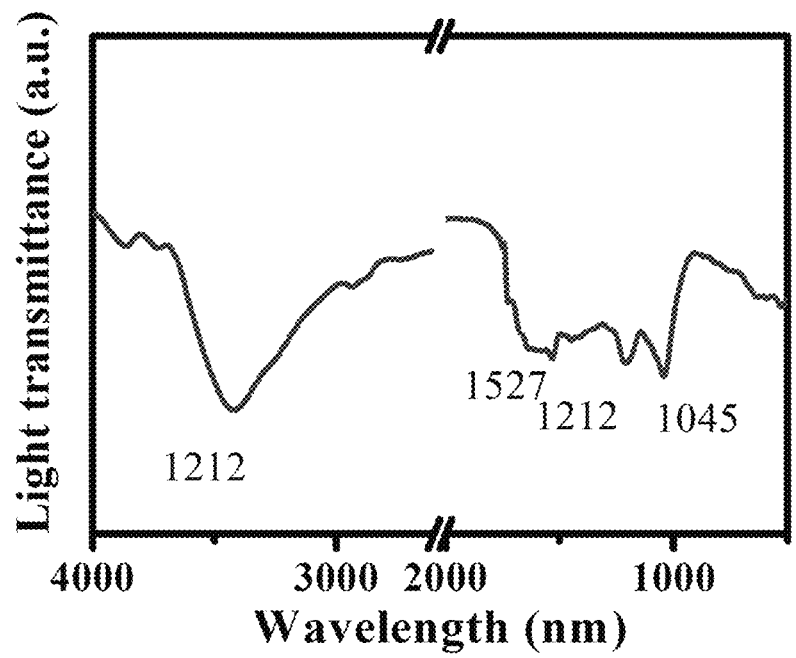
FIG. 5 is an FT-IR spectrum of the anthocyanin nanoparticles prepared in Example 1.

S5: Characterization of the Anthocyanin Nanoparticles by Fourier Transform Infrared (FT-IR) Spectroscopy FIG. 5 is an FT-IR spectrum of the anthocyanin nanoparticles prepared in Example 1. It can be seen from FIG. 5 that the surfaces of the anthocyanin nanoparticles contain C—C, C—O, C—N, C—H and other functional groups.

S6: Temperature Stability Experiments of the Anthocyanin Nanoparticles

A thermal stability test method is as follows: a 1 mg/mL anthocyanin nanoparticle aqueous solution was prepared, stored in an incubator under the condition of 55° C., placed continuously for 12 h, and monitored once every 2 h in the storage process.

Figure 6:
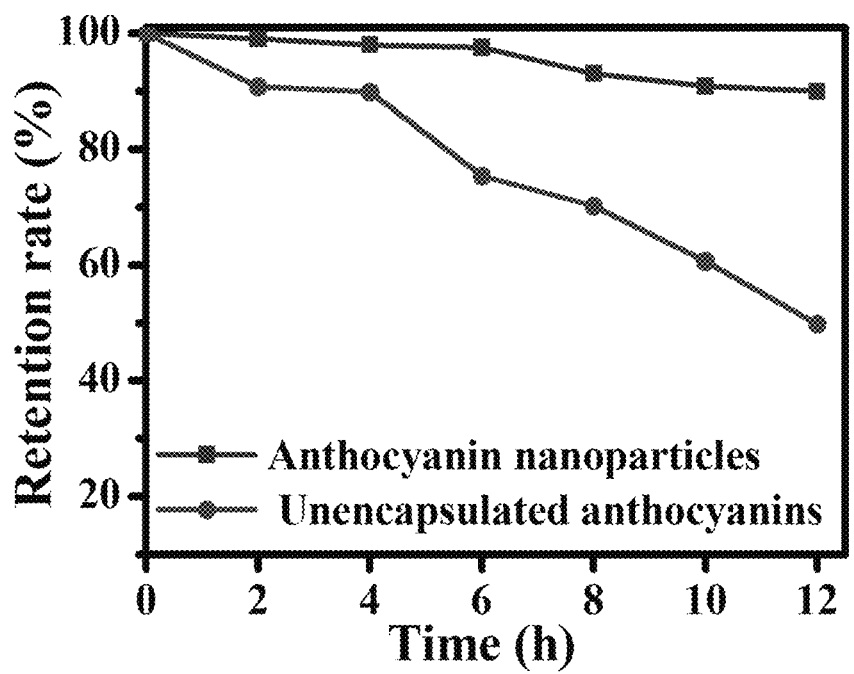
FIG. 6 is a spectrum showing the temperature stability of the anthocyanin nanoparticles prepared in Example 1.

FIG. 6 is a spectrum showing the thermal stability of the anthocyanin nanoparticles prepared in Example 1. It can be seen from FIG. 6 that the thermal stability of the anthocyanin nanoparticles is better than that of unencapsulated anthocyanins.

S7: NaCl Stability Experiments of the Anthocyanin Nanoparticles

A NaCl stability test method is as follows: 1 mg of the anthocyanin nanoparticle freeze-dried powder was taken, and the retention rates of anthocyanins were monitored under different NaCl solution concentrations (0.2M, 0.4M, 0.6M, 0.8M, and 1M).

Figure 7:
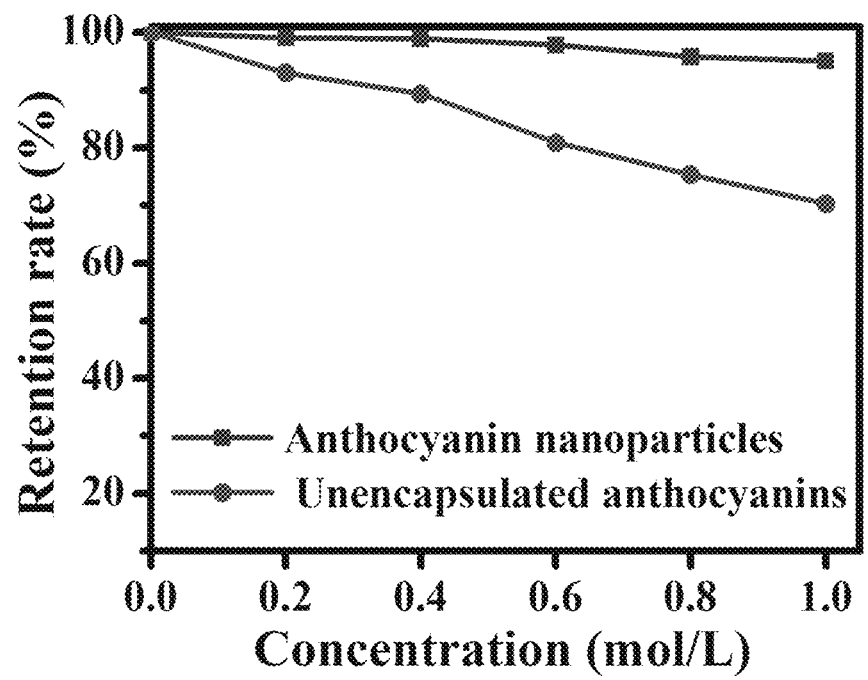
FIG. 7 is a spectrum showing the NaCl stability of the anthocyanin nanoparticles prepared in Example 1.

FIG. 7 is a spectrum showing the NaCl stability of the anthocyanin nanoparticles prepared in Example 1. It can be seen from FIG. 7 that the stability of the anthocyanin nanoparticles in a NaCl solution is better than the NaCl stability of the unencapsulated anthocyanins.

S8: PH Stability Experiments of the Anthocyanin Nanoparticles

A pH stability test method is as follows: B—R buffer solutions with different pHs (1-6) were prepared, the anthocyanin nanoparticles were respectively added into the solutions (1 mg/mL) with the different pHs, and the retention rates of the anthocyanins were monitored.

Figure 8:
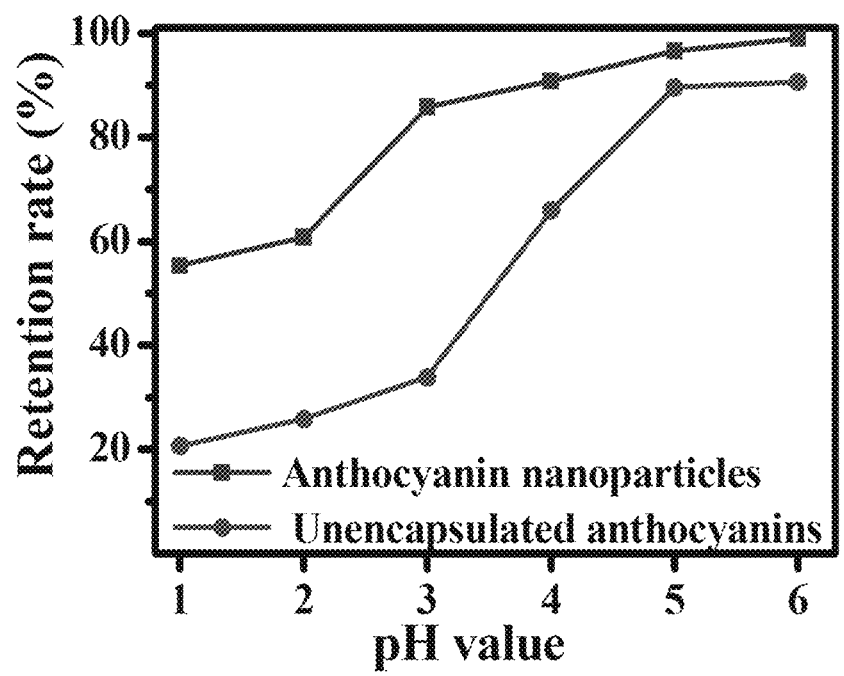
FIG. 8 is a spectrum showing the pH stability of the anthocyanin nanoparticles prepared in Example 1.

FIG. 8 is a spectrum showing the pH stability of the anthocyanin nanoparticles prepared in Example 1. It can be seen from FIG. 8 that the pH stability of the anthocyanin nanoparticles is better than that of the unencapsulated anthocyanins under the extremely acidic conditions at pH=1 to 4 or so.

S9: UV Stability Experiments of the Anthocyanin Nanoparticles

A UV stability test method is as follows: a 1 mg/mL anthocyanin nanoparticle aqueous solution was prepared, subjected to UV-irradiation under the condition that an excitation light wavelength was at 365 nm, irradiated continuously for 12 h, and monitored once every 2 h in the irradiation process.

Figure 9:
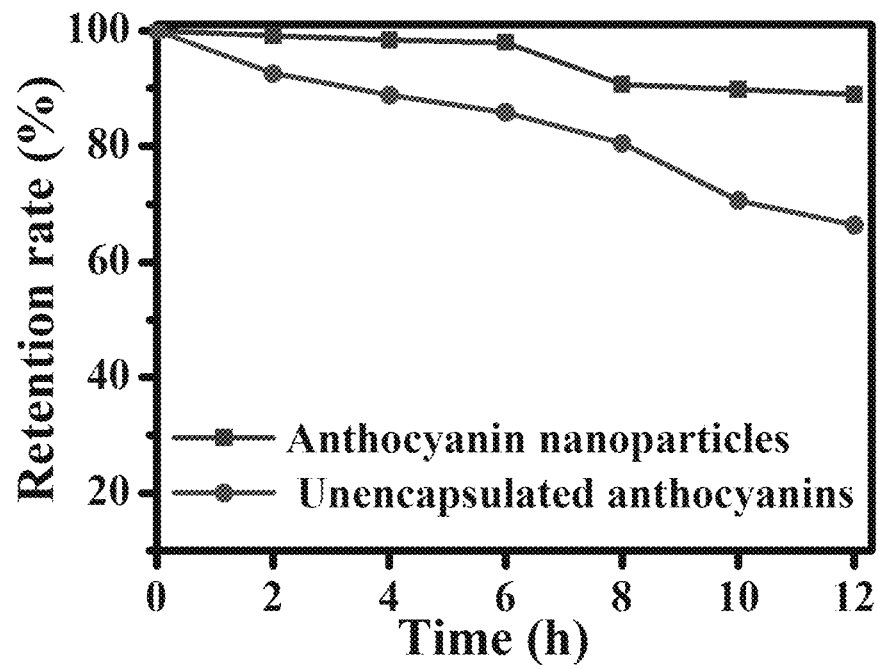
FIG. 9 is a spectrum showing the UV photostability of the anthocyanin nanoparticles prepared in Example 1.

FIG. 9 is a spectrum showing the UV stability of the anthocyanin nanoparticles. It can be seen from FIG. 9 that the UV stability of the anthocyanin nanoparticles is better than the UV stability of the unencapsulated anthocyanins.

S10: Storage Stability Experiments of the Anthocyanin Nanoparticles

A storage stability test method is as follows: a 1 mg/mL anthocyanin nanoparticle aqueous solution was prepared, and the prepared solution underwent a storage stability test at room temperature for 70 d and was monitored once every 10 d.

Figure 10:
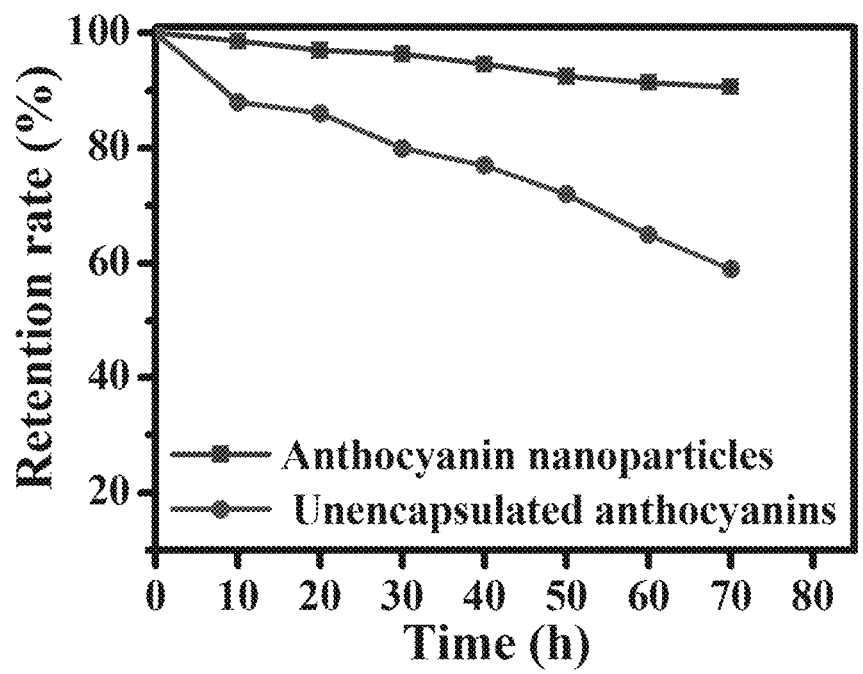
FIG. 10 is a spectrum showing the storage stability of the anthocyanin nanoparticles prepared in Example 1.

FIG. 10 is a spectrum showing the storage stability of the anthocyanin nanoparticles. It can be seen from FIG. 10 that the storage stability of the anthocyanin nanoparticles is better than that of the unencapsulated anthocyanins during storage.

Example 4: Protective Effect of the Anthocyanin Nanoparticles on Lipopolysaccharide (LPS)-Mediated RAW 264.7 Macrophage Apoptosis RAW 264.7 macrophages and a DMEM medium containing 10% (V fetal bovine serum/V DMEM medium=1/9) of fetal bovine serum were selected. Cells were seeded in a 96-well plate at a density of $5\times10^4$/well, and incubated in a $CO_2$ incubator with a volume fraction of 5% for 12 h; then, the unencapsulated anthocyanins with a final concentration of 40 μg/mL and the anthocyanin nanoparticles were added to the medium and cultured for another 12 h, and 50 μL of LPS (1 μg/mL) was added to each well to react for 12 h; and cell morphology observation and in situ fluorescence detection of adherent cells were performed.

In situ fluorescence detection of adherent cells: cells were stained with Annexin V-FITC and propidium iodide (PI) staining solution. In the figure, the green fluorescence was Annexin V-FITC stained positive cells (cytoplasm), and the red fluorescence was propidium iodide stained positive cells (nucleus). The apoptotic cells were only stained with green fluorescence (with bright spots), the necrotic cells were stained with both green and red fluorescence (with more bright spots), and the normal cells were not stained with fluorescence (without bright spots).

Figure 11:
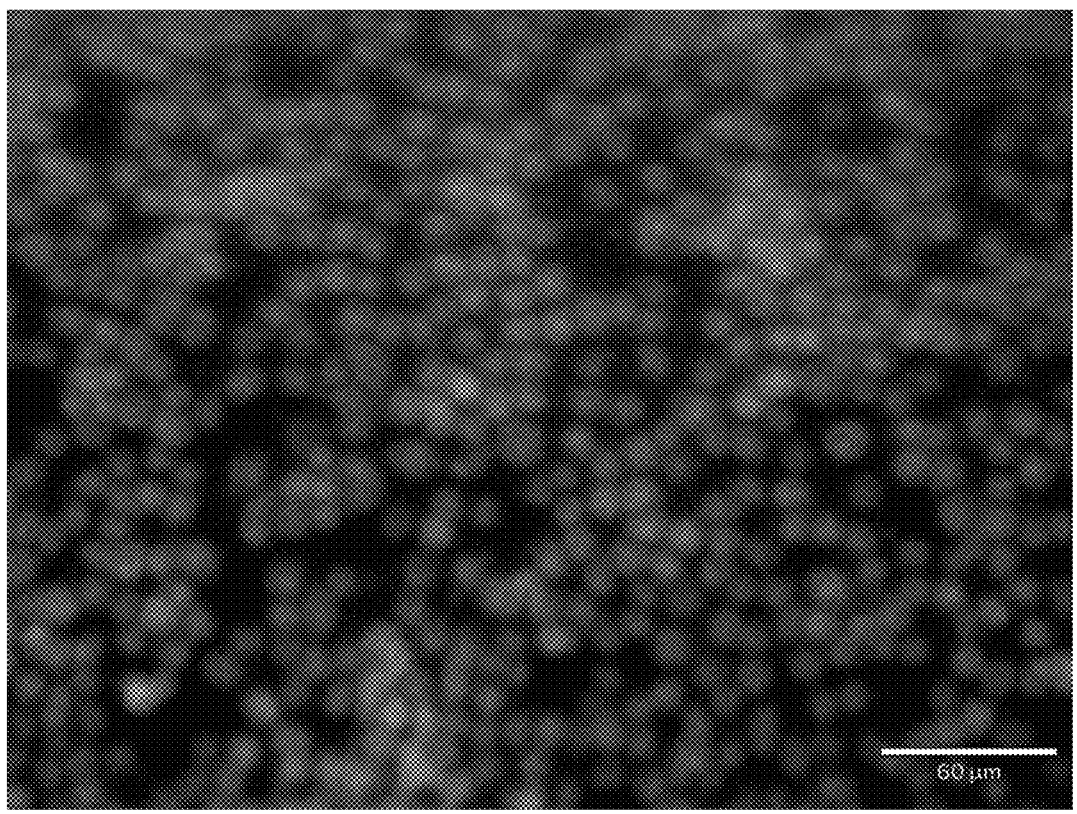
FIG. 11 is a fluorescence imaging of lipopolysaccharide (LPS)-mediated RAW 264.7 macrophage apoptosis.
Figure 12:
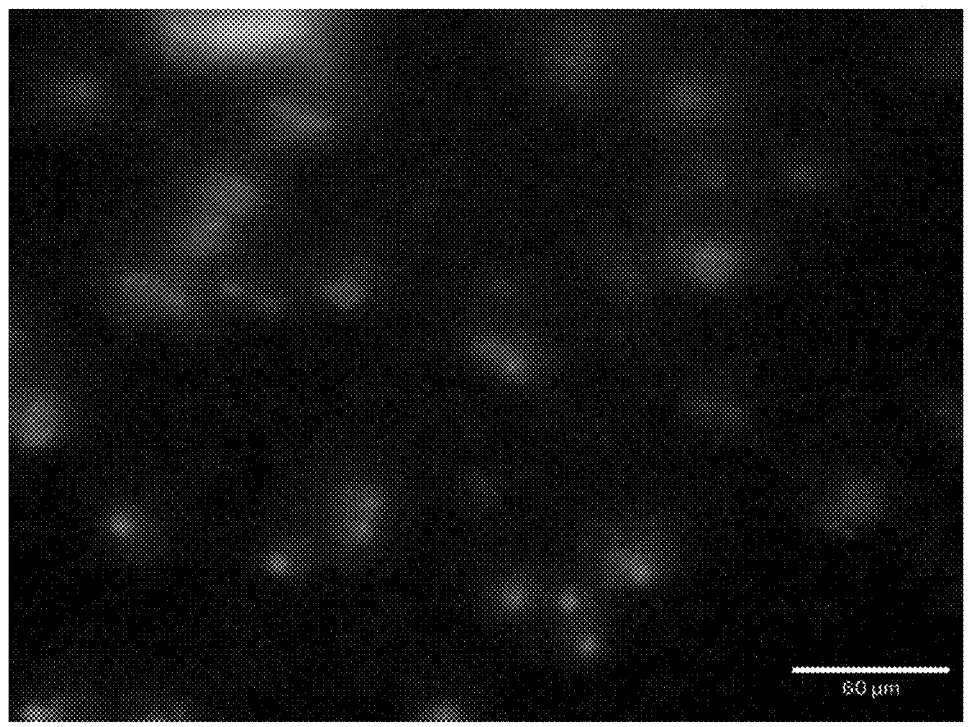
FIG. 12 is a fluorescence imaging of a protective effect of unencapsulated anthocyanins on lipopolysaccharide (LPS)-mediated RAW 264.7 macrophage apoptosis.
Figure 13:
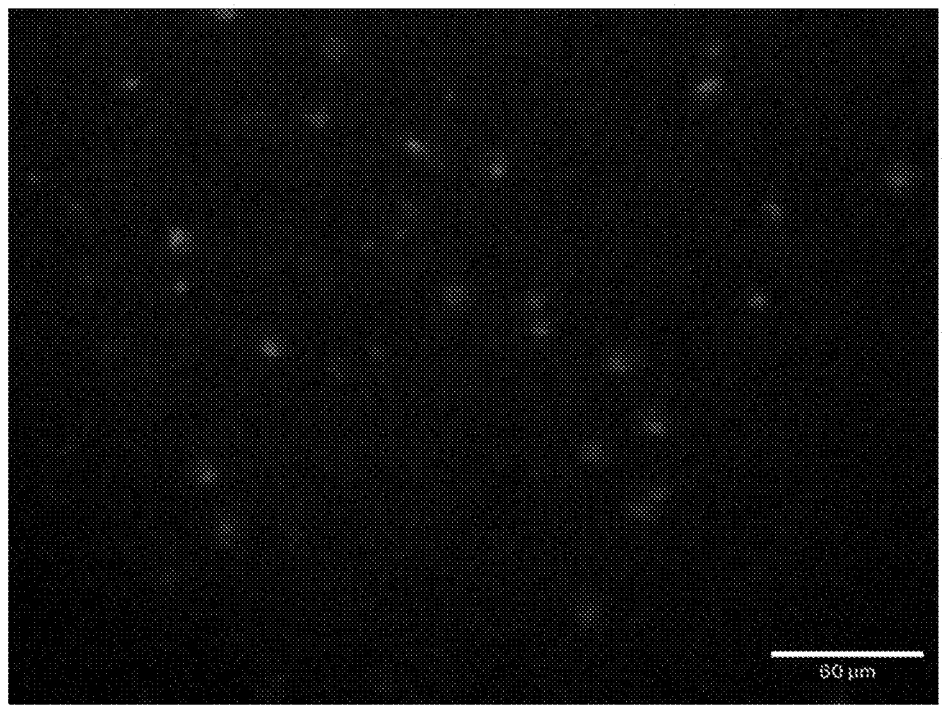
FIG. 13 is a fluorescence imaging of a protective effect of the anthocyanin nanoparticles prepared in Example 1 on lipopolysaccharide (LPS)-mediated RAW 264.7 macrophage apoptosis.

FIG. 11 is a fluorescence imaging of lipopolysaccharide (LPS)-mediated RAW 264.7 macrophage apoptosis. FIG. 12 is a fluorescence imaging of a protective effect of the unencapsulated anthocyanins on lipopolysaccharide (LPS)-mediated RAW 264.7 macrophage apoptosis. FIG. 13 is a fluorescence imaging of a protective effect of the anthocyanin nanoparticles prepared in Example 1 on lipopolysaccharide (LPS)-mediated RAW 264.7 macrophage apoptosis. FIG. 11 shows that LPS has a pro-apoptotic effect on RAW 264.7 macrophages. From FIG. 12, it can be observed that the unencapsulated anthocyanins have a certain protective effect on RAW 264.7 macrophages. From FIG. 13, it can be observed that the protective effect of the anthocyanin nanoparticles on RAW 264.7 macrophages is better than that of the unencapsulated anthocyanins, which shows the necessity for anthocyanin encapsulation.

Example 5: Colon-Targeted Delivery of the Anthocyanin Nanoparticles in Mice and Alleviation of DSS-Induced Colitis Injury Construction of enteritis mouse model: The mice were randomly divided into 5 groups, including a normal control group, a DSS injury group, a nanocarrier group without anthocyanins, an unencapsulated anthocyanin group, and an anthocyanin nanoparticle group.

(1) The mice in the normal control group were given continuously free drinking water (deionized water) for 12 d;

(2) the mice in the DSS injury group were given continuously free drinking water (deionized water) for 12 d, and DSS (5%, w/v) was added to the drinking water from the $7^{th}$ day;

(3) the mice in the nanocarrier group without anthocyanins were given continuously free drinking water (deionized water) for 12 d and daily gavaged with anthocyanin-free nanocarriers at a dose of 10 mg/kg, and DSS (5%, w/v) was added to the drinking water from the $7^{th}$ day;

(4) the mice in the unencapsulated anthocyanin group were given continuously free drinking water (deionized water) for 12 d and daily gavaged with the unencapsulated anthocyanins at a dose of 10 mg/kg, and DSS (5%, w/v) was added to the drinking water from the $7^{th}$ day; and (5) the mice in the anthocyanin nanoparticle group were given continuously free drinking water (deionized water) for 12 d and daily gavaged with the anthocyanin nanoparticles at a dose of 10 mg/kg, and DSS (5%, w/v) was added to the drinking water from the $7^{th}$ day.

Figure 14:
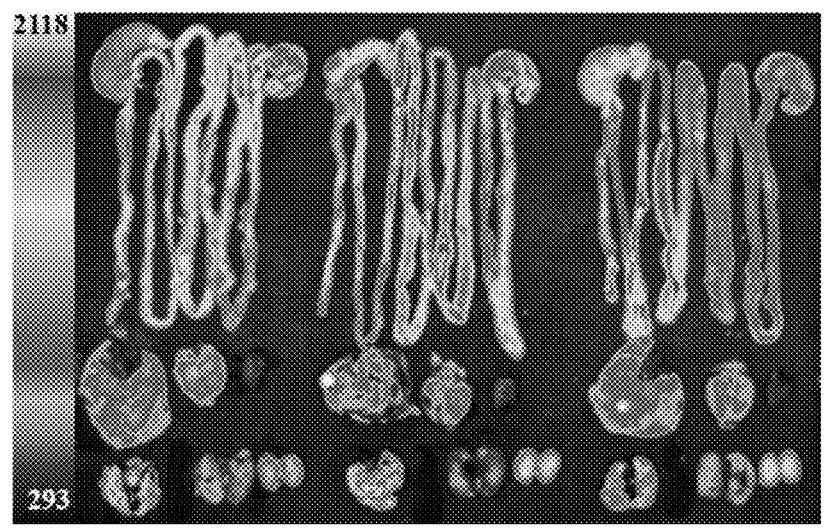
FIG. 14 is a pseudo-color image of the distribution imaging of the anthocyanin nanoparticles prepared in Example 1 for fluorescently labeling mouse tissues and organs.

FIG. 14 is a pseudo-color image of the distribution imaging of the anthocyanin nanoparticles for fluorescently labeling mouse tissues and organs. It can be observed from the figure that the anthocyanin nanoparticles are concentrated in the colons and can achieve colon-targeted delivery.

Figure 15:
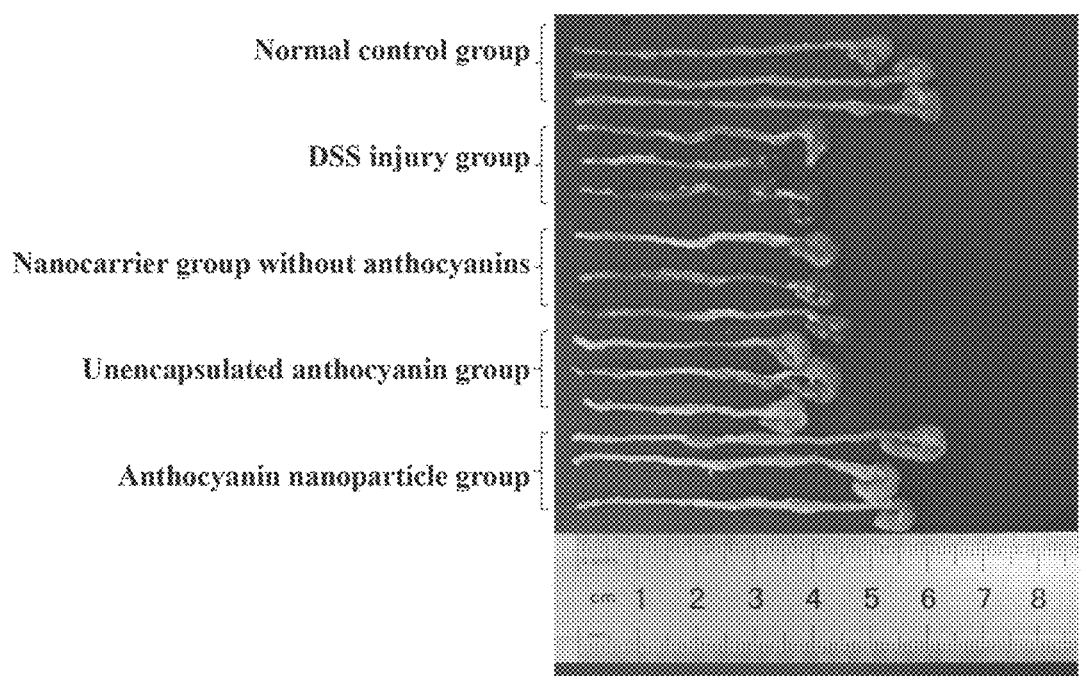
FIG. 15 is a graph showing that the anthocyanin nanoparticles prepared in Example 1 alleviate DSS-induced colitis injury.

FIG. 15 is a graph showing that the anthocyanin nanoparticles alleviate DSS-induced colitis injury. The results show that the anthocyanin nanoparticle group can effectively alleviate the DSS-induced colitis injury and thus has an effective protective effect on the colons of mice, and the protective effect of the anthocyanin nanoparticle group is better than that of the unencapsulated anthocyanin group.

The foregoing descriptions are merely exemplary specific implementations of the disclosure, but the protection scope of the disclosure is not limited thereto. Any equivalent replacement or change made by those skilled in the art within the technical scope provided by the disclosure according to the technical solution of the disclosure and the inventive concept thereof shall fall within the protection scope of the disclosure.

What is claimed is:

1. Marine polysaccharide vector-based anthocyanin nanoparticles, wherein the anthocyanin nanoparticles comprises sodium alginate, food-borne fluorescent nanoparticles and sodium hyaluronate as a composite vector combined with anthocyanin.

2. A preparation method for the marine polysaccharide vector-based anthocyanin nanoparticles according to claim 1, comprising the following steps:

S1: dissolving sodium alginate in phosphate buffered saline with a pH value of 4.75-6, adding 1-ethyl-(3-dimethylaminopropyl) carbodiimide (EDC) and 1-hydroxybenzotriazole (HOBt) successively, stirring at room temperature for 60-80 minutes and then adding food-borne fluorescent nanoparticles, continuing to stir for 24-30 hours, and carrying out dialysis with deionized water for 24-72 hours and freeze drying to obtain a fluorescence-alginate complex;

S2: adding the fluorescence-alginate complex into N, N-dimethylformamide (DMF) and (dichloromethane (DCM) which are mixed in a volume ratio of 1:(1-1.5), adding diisopropyl carbodiimide (DIC) and dimethylaminopyridine (DMAP) thereinto, and stirring at room temperature for 1-1.5 hours;

S3: adding anthocyanin and hyaluronic acid to react at room temperature for 24-30 hours, and washing with the DCM for 3-5 times to remove a solvent; and S4: removing unreacted small molecules and the DMF, pre-cooling at −20° C. to −80° C. for 2-3 hours, and carrying out freeze drying at −50° C. to −55° C. for 24-72 hours under the condition that the vacuum degree is 35-45 Pa.

3. The preparation method for the marine polysaccharide vector-based anthocyanin nanoparticles according to claim 2, wherein the method for removing the solvent in step S3 comprises evaporation, and the evaporation conditions are a temperature of 25-40° C. and a vacuum degree range of 0.29-1.6 mbar.

4. The preparation method for the marine polysaccharide vector-based anthocyanin nanoparticles according to claim 2, wherein the method for removing the unreacted small molecules in step S4 comprises first washing with the DMF and then dialyzing with the DMF; and a method for removing the DMF comprises dialyzing with deionized water.

5. The preparation method for the marine polysaccharide vector-based anthocyanin nanoparticles according to claim 2, wherein the stirring speed in steps S1 and S2 is 500-800 r/min.

6. The preparation method for the marine polysaccharide vector-based anthocyanin nanoparticles according to claim 2, wherein preparation of the food-borne fluorescent nanoparticles comprises the following steps:

cutting meat into pieces, roasting said pieces at 150° C. to 320° C. for 15-40 minutes, soaking in absolute ethanol and stirring continuously for 12-36 hours, and removing ethanol from a filtered soluble portion; and preparing a solution by using trichloromethane and water in a ratio of 3:1, using the solution for redissolving the soluble portion from which the ethanol has been removed, adding trichloromethane for extraction and repeated degreasing until an oil phase is clarified, selecting a clear water phase portion to undergo chromatography, pre-cooling the fluorescent portion at −20° C. to −80° C. for 2-3 hours, and then carrying out freeze drying at −45° C. to −55° C. for 24-72 hours under the condition that the vacuum degree is 35-45 Pa.

7. The marine polysaccharide vector-based anthocyanin nanoparticles according to claim 1, wherein preparation of the food-borne fluorescent nanoparticles comprises the following steps:

cutting meat into pieces, roasting said pieces at 150° C. to 320° C. for 15-40 minutes, soaking in absolute ethanol and stirring continuously for 12-36 hours, and removing ethanol from a filtered soluble portion; and preparing a solution by using trichloromethane and water in a ratio of 3:1, using the solution for redissolving the soluble portion from which the ethanol has been removed, adding trichloromethane for extraction and repeated degreasing until an oil phase is clarified, selecting a clear water phase portion to undergo chromatography, pre-cooling the fluorescent portion at −20° C. to −80° C. for 2-3 hours, and then carrying out freeze drying at −45° C. to −55° C. for 24-72 hours under the condition that the vacuum degree is 35-45 Pa.

8. The marine polysaccharide vector-based anthocyanin nanoparticles according to claim 7, wherein chromatographic column packing for chromatography in step S2 is composed of D101 macroporous adsorption resin.

* * * * *